(12) United States Patent
Küsel

(10) Patent No.: US 7,673,740 B2
(45) Date of Patent: Mar. 9, 2010

(54) DEVICE FOR MONITORING A CONVEYOR

(75) Inventor: Bernd Küsel, Hamburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 66 days.

(21) Appl. No.: 12/084,222

(22) PCT Filed: Mar. 21, 2006

(86) PCT No.: PCT/DE2006/000493

§ 371 (c)(1),
(2), (4) Date: Apr. 28, 2008

(87) PCT Pub. No.: WO2007/048365

PCT Pub. Date: May 3, 2007

(65) Prior Publication Data

US 2009/0101482 A1 Apr. 23, 2009

(30) Foreign Application Priority Data

Oct. 29, 2005 (DE) .................. 10 2005 051 888

(51) Int. Cl.
*B65G 43/02* (2006.01)
(52) U.S. Cl. .............................. 198/810.02; 198/810.03
(58) Field of Classification Search ............ 198/810.02, 198/810.03
See application file for complete search history.

(56) References Cited

U.S. PATENT DOCUMENTS

| | | | |
|---|---|---|---|
| 6,047,814 A * | 4/2000 | Alles et al. ............. | 198/810.02 |
| 6,291,991 B1 * | 9/2001 | Schnell ........................ | 324/235 |
| 6,702,103 B1 | 3/2004 | Küsel | |
| 6,715,602 B1 * | 4/2004 | Gartland ................ | 198/810.02 |
| 6,781,515 B2 * | 8/2004 | Kuzik et al. .................. | 340/676 |
| 6,831,566 B1 | 12/2004 | Küsel | |
| 7,178,663 B2 * | 2/2007 | Schnell .................. | 198/810.03 |
| 7,234,586 B1 * | 6/2007 | Newman ..................... | 198/495 |
| 7,259,854 B2 | 8/2007 | Schnell | |
| 7,427,767 B2 * | 9/2008 | Kemp ..................... | 250/559.39 |
| 7,440,872 B2 * | 10/2008 | Bondarev et al. ........... | 702/188 |

(Continued)

FOREIGN PATENT DOCUMENTS

DE 31 06 568 9/1982

(Continued)

*Primary Examiner*—Douglas A Hess
(74) *Attorney, Agent, or Firm*—Collard & Roe, P.C.

(57) ABSTRACT

The invention relates to an apparatus for monitoring a conveying installation, comprising: a conveying belt (2) made of elastomeric material with a load-bearing side (3) for the conveying material and with a running side (4), the conveying belt having, in particular, an embedded reinforcing element (7); at least one detectable segment (8) which is embedded in the load-bearing side (3) and/or running side, in the vicinity of the surface; a detection system (6), in particular in the form of an optoelectronic system, which contactlessly senses and evaluates the detectable segment (8), in particular in conjunction with a process computer; and other installation parts, namely a drive drum, reversing drum, supporting rollers, supporting frameworks, and possibly other components; the detectable segment (8) being based on a thermochromic substance which results in a change in color if the temperature changes within the critical temperature range of a conveying belt, the detection system (6) sensing and evaluating the change in color.

16 Claims, 1 Drawing Sheet

U.S. PATENT DOCUMENTS

| | | | |
|---|---|---|---|
| 7,494,004 B2 * | 2/2009 | Stolyar et al. | 198/810.02 |
| 2004/0262132 A1 * | 12/2004 | Pauley et al. | |
| 2009/0272633 A1 * | 11/2009 | Kropf-Eilers | |

FOREIGN PATENT DOCUMENTS

| | | |
|---|---|---|
| DE | 44 44 264 | 4/1996 |
| DE | 100 29 545 | 2/2001 |
| DE | 100 00 813 | 7/2001 |
| DE | 101 29 091 | 5/2002 |
| DE | 101 40 920 | 5/2002 |
| EP | 1 053 447 | 11/2000 |
| EP | 1 187 781 | 3/2002 |
| EP | 1 222 126 | 7/2002 |
| WO | WO 97/27360 | 7/1997 |
| WO | WO 99/41567 | 8/1999 |
| WO | WO 2005/023688 | 3/2005 |

* cited by examiner

DEVICE FOR MONITORING A CONVEYOR

CROSS REFERENCE TO RELATED APPLICATIONS

This application is the National Stage of PCT/DE2006/000493 filed on Mar. 21, 2006, which claims priority under 35 U.S.C. §119 of German Application No. 10 2005 051 888.5 filed on Oct. 29, 2005. The international application under PCT article 21(2) was not published in English.

The invention relates to a device for monitoring a conveyor, comprising:
- a conveyor belt made of elastomer material, having a carrying side for the material to be conveyed, and a running side, whereby the conveyor belt has, in particular, an embedded strength support;
- at least one detectable segment that is embedded into the carrying side and/or the running side, close to the surface;
- a detection system, particularly in the form of an opto-electronic system, which detects and evaluates the detectable segment, without making contact, particularly in connection with a process computer; and
- other system parts, namely drive drum, reversing drum, support rollers, support scaffolding, as well as any other components that might be necessary.

Since conveyor belts are often the most important parts of the system, and their failure can frequently result in a complete shut-down of production, methods for automatic, continuous monitoring of the conveyor belts are required. Aside from the known methods of slit monitoring (DE 44 44 264 C2) and connection monitoring (EP 1 053 447 B1), methods for monitoring the entire belt surface are also in demand, in order to recognize wear damage or surface impact damage and its further development during operation, and to shut the belt down if a critical state is reached, in order to be able to initiate repair measures.

To achieve this goal, the use of opto-electronic systems, in turn particularly in the form of electronic camera systems (line camera or surface camera), was proposed as a detection system, whereby reference is made to the following state of the art:

DE 100 29 545 A1
DE 101 00 813 A1
DE 101 29 091 A1
DE 101 40 920 A1
EP 1 187 781 B1
EP 1 222 126 B1
WO 2005/023688 A1

Figure 1:
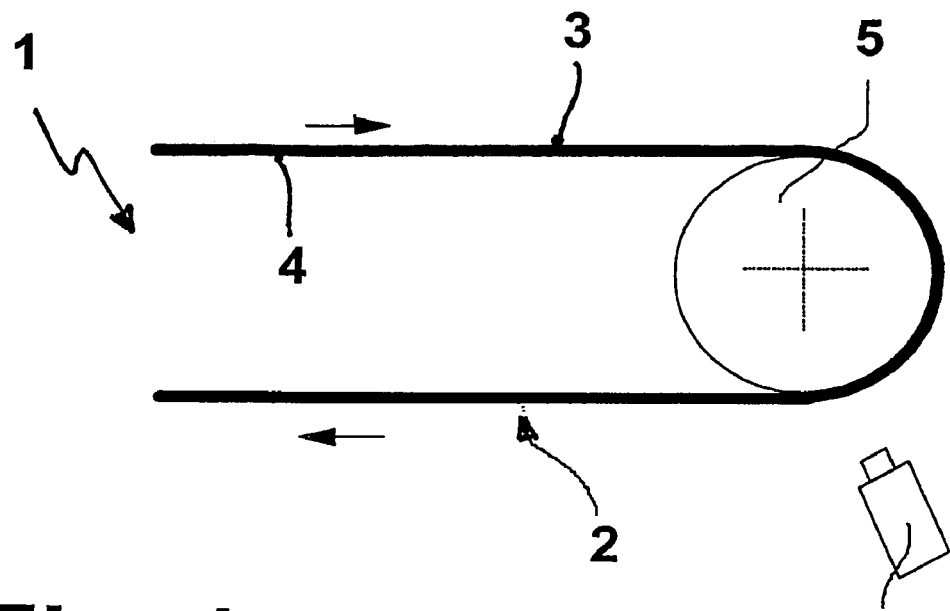

These opto-electronic systems generate images of the belt surface to be monitored. The detectable segment is a transponder, for example, in connection with an antenna (WO 2005/023688 A1; FIG. 1).

Conveyor belts having woven or steel cable tension supports, possibly supplemented with heat-resistant inlays of metal or plastic as protection against glowing embers burning through, and provided on both sides with elastomer cover plates (carrying side, running side), are frequently used for transporting warm material, in particular. These heat-resistant conveyor belts are primarily used in steel plants, foundries, cement plants, coking plants, and in the chemical industry. These are usually short systems, having a length of less than 200 m.

Conveyor belts for normal use, for example in the extraction of raw materials such as coal, salt, gravel, etc., are generally based on the materials natural rubber (NR) or styrene butadiene (SBR). The heat resistance of such rubber mixtures amounts to as much as 80° C. In the case of longer excess stress in terms of temperature, hardening of the rubber occurs, all the way to the cover plates breaking up or bursting off. The conveyor belt becomes unusable as a result.

For greater temperature stresses, elastomers on the basis of an ethylene/propylene/diene mixed polymerizate (EPDM), butyl rubber (IIR), or chloroprene (CR) are therefore used. Each of these grades covers a specific temperature resistance field.

In practical situations, however, excess stresses and irreparable damage to the conveyor belt frequently occur either because a grade with insufficient resistance was used, or because unexpectedly high material temperatures occurred. In this connection, it is generally difficult to determine the cause afterwards.

The task of the invention now consists in making a device of this type available, in which the temperature development of a conveyor belt can be observed with regard to an undesirable temperature progression.

This task is accomplished in that the detectable segment is based on a thermochromic substance, which brings about a color change in the case of temperature changes within the critical temperature range of a conveyor belt, whereby the detection system detects and evaluates the color change.

Thermochromism exists if temperature changes bring about a color change in a substance. Examples: ruby, which is red, becomes green when heated, and red again when it cools. Mercury-I-chloride, which is white, becomes yellowish when heated slightly. Pure zinc oxide is colorless at the usual temperature, but yellow when heated. Minimum becomes dark when heated, and red again when it cools.

The thermochromic substance for the conveyor belt should be resistant up to 300° C., whereby this limit temperature clearly lies above the resistance of elastomers, whereby the resistance—as already explained above—is dependent on the elastomer type.

It is important that the color changes of the thermochromic substance occur within the critical temperature range (80° C. to 150° C.) of conveyor belts. It is particularly practical if a first color change occurs at 80° C. (first critical point), and a significant second color change occurs at 150° C. (second critical point), so that measures (alarm signal and/or automatic shut-down of the conveyor) can be taken here, at the latest.

Part of the inorganic substances mentioned above, which only undergo a color change when heated (generally above 300° C.), are not suitable here.

In contrast, any inorganic or synthetic pigments or polymer compounds having a color change characteristic within the critical temperature range of a conveyor belt can be used.

It is practical if the thermochromic substance brings about reversible color changes with regard to temperature changes, in that the original color state recurs during the cooling process. (Example 1: blue ⇔ red; Example 2: blue ⇔ transition color ⇔ red).

A thermochromic substance that is based on a polymer compound having a color change characteristic, connected with a change in the polymer molecular structure that triggers the color change, is particularly suitable. In this connection, the polymer compound is preferably a polyacetylene (polyyne) that has reactive triple bonds. Polyacetylenes are easily polymerizing organic compounds that are relatively insensitive to oxygen. In contrast, hydrogen is easily added on. The polymerizates are brown to red in the case of the diacetylene compounds, and dark-blue in the case of the tetraacetylenes. These polymer compounds are furthermore characterized by a temperature-dependent color change characteristic. They are therefore well suited for the area of use of conveyor belts.

The detectable segment particularly comprises a matrix in which the thermochromic substance is embedded with a uniform distribution. The proportion of the thermochromic substance within the matrix amounts to 0.5 to 5 wt.-%, particularly 1 to 3 wt.-%. The matrix itself consists of an elastomer material, a thermoplastic elastomer (TPE), or a thermoplastic. Preferably, the matrix consists of an elastomer mixture on the basis of polybutadiene.

Figure 2:
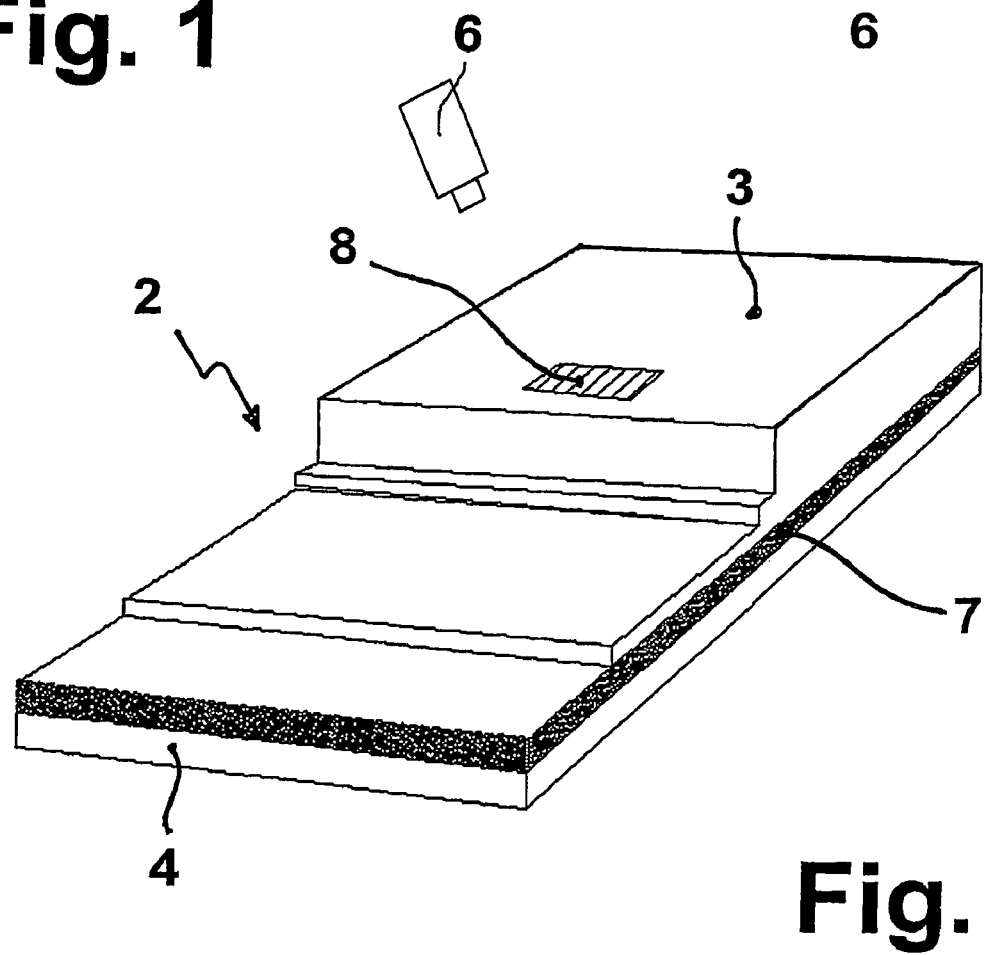

The invention will now be explained using exemplary embodiments, making reference to schematic drawings. These show:

FIG. 1 a conveyor belt having an opto-electronic system;

FIG. 2 a conveyor belt having a thermochromic segment within the carrying side.

FIG. 1 shows a conveyor 1, comprising a conveyor belt 2 made of elastomer material, having a carrying side 3 for the material to be conveyed, and a running side 4. The material to be conveyed, having the transport direction in the direction of the arrow, is thrown off at the reversing drum 5.

A detection system 6 in the form of an opto-electronic system detects the carrying side 3 of the conveyor belt 2 within its region that is free of material, specifically and in particular, immediately after the material to be conveyed is thrown off at the reversing drum 5. Here, visual querying of the color takes place by means of the detection system, specifically in connection with a process computer. The process computer is connected with the drive control of the conveyor, in optimal manner, so that when a critical state is reached, the system is automatically shut down. With regard to related details, reference is particularly made to WO 2005/023688 A1.

FIG. 2 now shows details of the conveyor belt 2 having the carrying side 3 and running side 4, as well as an embedded strength support 7 in the form of a woven tension support. The conveyor belt can furthermore have an embedded crosswise reinforcement (e.g. steel crosswise reinforcement).

Particularly within the carrying side 3 of the conveyor belt 2, at least one detectable segment 8 is embedded close to the surface. Here, the segment is disposed within the center of the conveyor belt. The principle of arranging two or more segments next to one another, specifically covering the two edge regions of the conveyor belt, is also possible. The surface dimensions of a segment, which is generally rectangular, are about 100×100 mm, so that this segment can also be detected with the eyes of the inspection personnel, as a human detection system, if necessary.

The detectable segment 8 comprises a matrix in which the thermochromic substance is embedded, with uniform distribution. In this manner, the segment can be installed into the conveyor belt cover plate in simple manner. Also, such a segment can be implemented by means of vulcanization during endless closing of the conveyor belt. Retrofitting on site is also possible.

The thermochromic substance now changes its color as a function of the temperature. For example, it can appear blue in the sub-critical range (up to 80° C.), while a color change occurs in the critical range (80° C. to 150° C.), particularly in the form of red. Color gradations (intermediate colors from blue/red) within the critical range are also possible.

In the longitudinal direction of the conveyor belt, multiple detectable segments disposed at regular intervals can be present, whereby the distance amounts to 10 m to 500 m, depending on the size of the system.

Within the framework of a conveyor that is controlled completely electronically, which is the standard in most cases nowadays, the detection system 6 can be equipped in such a manner, depending on the elastomer material that is used (NR, SBR, EPDM, IIR, CR) and on the heat constellation of the material being conveyed, in such a manner that appropriate measures (alarm signal and/or automatic shut-down of the conveyor) are triggered at a specific temperature (e.g. 120° C.).

By means of this recognition measure, it is furthermore possible to ensure that either the temperature of the material being conveyed is lowered, or a conveyor belt having a greater temperature resistance is used.

REFERENCE SYMBOL LIST 1 conveyor
2 conveyor belt
3 carrying side
4 running side
5 reversing drum
6 detection system (opto-electronic system)
7 strength support
8 detectable segment (thermochromic segment)

The invention claimed is:

1. A device for monitoring a conveyor, comprising:
a conveyor belt made of elastomer material, having a carrying side for the material to be conveyed, and a running side, whereby the conveyor belt has, an embedded strength support;
at least one detectable segment that is embedded into the carrying side and/or the running side, close to the surface; and
a detection system comprising an opto-electronic system, which detects and evaluates the detectable segment, without making contact, in connection with a process computer;
a reversing drum;
wherein the detectable segment comprises a matrix and a thermochromic substance worked into the matrix, the thermochromic substance bringing about a color change in the case of temperature changes within a critical temperature range of a conveyor belt, whereby the detection system detects and evaluates the color change.

2. The device according to claim 1, wherein the detectable segment has an original color state and the thermochromic substance brings about reversible color changes with regard to temperature changes, in that the original color state recurs during the cooling process.

3. The device according to claim 1, wherein the color change occurs within the temperature range of 80° C. to 150° C.

4. The device according to claim 3, wherein the color change takes place without any transition, or in color gradations.

5. The device according to claim 1, wherein the thermochromic substance is based on inorganic or synthetic pigments having a color change characteristic.

6. The device according to claim 1, wherein the thermochromic substance is based on a polymer compound having a color change characteristic.

7. The device according to claim 6, wherein the polymer compound has a polymer molecular structure and when the temperature changes, the polymer compound undergoes a change in the polymer molecular structure that triggers the color change.

8. The device according to claim 6, wherein the polymer compound is a polyacetylene.

9. The device according to claim 1, wherein the thermochromic substance is worked into the matrix with a uniform distribution.

10. The device according to claim 1, wherein the matrix contains from 0.5 wt.-% to 5 wt.-% of the thermochromatic substance.

11. The device according to claim 10, wherein the matrix contains from 1 wt.-% to 3 wt.-% of the thermochromatic substance.

12. The device according to claim 1, wherein the matrix comprises an elastomer material, a thermoplastic elastomer (TPE), or a thermoplastic.

13. The device according to claim 12, wherein the matrix comprises an elastomer mixture on the basis of polybutadiene.

14. The device according to claim 1, wherein in a longitudinal direction of the conveyor belt, multiple detectable segments are present, disposed at intervals, within at least one of the carrying side and the running side.

15. The device according to claim 14, wherein the detectable segments are equidistantly spaced.

16. The device according to claim 14, wherein the detectable segments are spaced by a distance of from 10 m to 500 m.

* * * * *